(12) United States Patent
Hamalainen et al.

(10) Patent No.: US 9,001,905 B2
(45) Date of Patent: Apr. 7, 2015

(54) DISTANCE ESTIMATION

(75) Inventors: Ari Henrik Hamalainen, Vantaa (FI); Ilari Aleksi Teikari, Helsinki (FI)

(73) Assignee: Nokia Corporation, Espoo (FI)

( * ) Notice: Subject to any disclaimer, the term of this patent is extended or adjusted under 35 U.S.C. 154(b) by 566 days.

(21) Appl. No.: 12/777,350

(22) Filed: May 11, 2010

(65) Prior Publication Data

US 2010/0239042 A1    Sep. 23, 2010

Related U.S. Application Data

(63) Continuation-in-part of application No. 12/673,548, filed as application No. PCT/IB2007/003164 on Aug. 14, 2007.

(51) Int. Cl.
 *H04L 1/02* (2006.01)
 *H04L 27/26* (2006.01)
 *H04L 25/02* (2006.01)

(52) U.S. Cl.
 CPC .......... *H04L 27/2647* (2013.01); *H04L 25/022* (2013.01); *H04L 27/2662* (2013.01)

(58) Field of Classification Search
 USPC .................................................. 375/260, 267
 See application file for complete search history.

(56) References Cited

U.S. PATENT DOCUMENTS

| | | | |
|---|---|---|---|
| 3,916,410 A | 10/1975 | Elwood | |
| 4,665,404 A | 5/1987 | Christy et al. | |
| 6,181,944 B1 | 1/2001 | Uebayashi et al. | |
| 6,529,708 B1 | 3/2003 | Larsson et al. | |
| 7,054,126 B2 | 5/2006 | Strutt et al. | |
| 2001/0033547 A1 | 10/2001 | Izumi | |
| 2003/0162547 A1 | 8/2003 | McNair | |
| 2004/0260506 A1 | 12/2004 | Jones et al. | |
| 2006/0126490 A1 | 6/2006 | Hagen et al. | |
| 2006/0140308 A1 | 6/2006 | MacFarlane Shearer et al. | |
| 2006/0154611 A1 | 7/2006 | Newton et al. | |
| 2006/0197704 A1* | 9/2006 | Luzzatto et al. | 342/458 |
| 2007/0018891 A1* | 1/2007 | Golden et al. | 342/420 |
| 2007/0200759 A1* | 8/2007 | Heidari-Bateni et al. | 342/387 |
| 2007/0279237 A1* | 12/2007 | Julian et al. | 340/686.1 |
| 2010/0220012 A1* | 9/2010 | Reede | 342/387 |

FOREIGN PATENT DOCUMENTS

GB    2405276 A    2/2005

OTHER PUBLICATIONS

International Search Report for PCT/IB2007/003164 (WO 2009/022192 A1) Issued Apr. 1, 2008.
Study on ranging technique for OFDM target detection scheme, Hui-Ming Zhang et al, Journal of Detection and Control, Oct. 2005, vol. 27 No. 4.

(Continued)

*Primary Examiner* — Shuwang Liu
*Assistant Examiner* — Ross Varndell
(74) *Attorney, Agent, or Firm* — Banner & Witcoff, Ltd.

(57) ABSTRACT

A method, comprising: periodically enabling reception of a signal at a receiver, every first time; transforming the received signal in order to determine data in the received signal; comparing the determined data with reference data; and using the difference between the determined data and the reference data to estimate a correction to a multiple of the first time in order to determine a distance between the receiver and an origin of the signal.

17 Claims, 8 Drawing Sheets

(56) References Cited

OTHER PUBLICATIONS

International Search Report for 07825458.8-2220/2183614, Issued Feb. 16, 2011.
Office Actiion dated Sep. 19, 2012 of EP Application No. 07825458.8-2220.
Article—Dean L. Mensa: "3.1.2 Stepped Frequency CW—Systems" In: "High Resolution Radar Cross-Section Imaging", Jan. 1, 1991, Artech House, XP55038004, ISBN: 978-0-89-006389-7, pp. 52-55.
Non-Final Office Action dated Feb. 15, 2013 of U.S. Appl. No. 12/673,548.
U.S. Appl. No. 12/673,548—Notice of Allowance dated Dec. 4, 2013.
U.S. Appl. No. 12/673,548—Notice of Allowance dated Sep. 11, 2013.

* cited by examiner

DISTANCE ESTIMATION

FIELD OF THE INVENTION

Embodiments of the present invention relate to distance estimation. In particular, they relate to apparatus, a method, a computer program, a chipset and a module for distance estimation using at least one radio frequency signal.

BACKGROUND TO THE INVENTION

In many situations, it is desirable to determine the distance from one point to another, for example, to locate an object. It is possible to determine a distance between two points by using radio frequency (RF) waves. Some methods of distance determination involve using a first device to transmit an RF signal to a second device, and determining the distance between them by analyzing the attenuation that has occurred during the propagation of the signal.

Other methods of distance determination involve determining the time of flight of a signal that is transmitted from a first device to a second device and then using the equation:

$$d = c \times t_{tof} \quad (1)$$

where d=the distance between the first and second devices, c is the speed of light and $t_{tof}$ is the time of flight.

In order to make estimate the distance as accurate as possible, the time of flight should be determined with as little error as possible.

BRIEF DESCRIPTION OF VARIOUS EMBODIMENTS OF THE INVENTION

According to various embodiments of the invention there is provided a method, comprising: periodically enabling reception of a signal at a receiver, every first time; transforming the received signal in order to determine data in the received signal; comparing the determined data with reference data; and using the difference between the determined data and the reference data to estimate a correction to a multiple of the first time in order to determine a distance between the receiver and an origin of the signal.

According to various embodiments of the invention there is provided apparatus, comprising: a receiver configured to be enabled periodically to receive a signal, every first time; transformation circuitry configured to transform a received signal, to determine data in the received signal; a comparator configured to compare the determined data with reference data; and estimation circuitry configured to use the difference between the determined data and the reference data to estimate a correction to a multiple of the first time, in order to determine a distance between the receiver and an origin of the signal.

According to various embodiments of the invention there is provided a module, comprising: transformation circuitry configured to transform a received signal, to determine data in a received signal, the signal being received periodically every first time; a comparator configured to compare the determined data with reference data; and estimation circuitry configured to use the difference between the determined data and the reference data to estimate a correction to a multiple of the first time, in order to determine a distance between the receiver and an origin of the signal.

According to various embodiments of the invention there is provided a chipset, comprising: transformation circuitry configured to transform a received signal, to determine data in a received signal, the signal being received periodically every first time; a comparator configured to compare the determined data with reference data; and estimation circuitry configured to use the difference between the determined data and the reference data to estimate a correction to a multiple of the first time, in order to determine a distance between the receiver and an origin of the signal.

According to various embodiments of the invention there is provided a computer program, comprising: instructions for transforming a received signal, to determine data in a received signal, wherein the signal is received periodically every first time; instructions for comparing the determined data with reference data; and instructions for using the difference between the determined data and the reference data to estimate a correction to a multiple of the first time, in order to determine a distance between the receiver and an origin of the signal.

BRIEF DESCRIPTION OF THE DRAWINGS

For a better understanding of various embodiments of the present invention, reference will now be made by way of example only to the accompanying drawings in which:

FIG. 5 illustrates a schematic block diagram of a first method;

DETAILED DESCRIPTION OF VARIOUS EMBODIMENTS OF THE INVENTION

The Figures illustrate an apparatus 10, comprising: a receiver 18 configured to be enabled periodically to receive a signal, every first time; transformation circuitry 306 configured to transform a received signal, to determine data in the received signal; a comparator 316 configured to compare the determined data with reference data; and estimation circuitry 304 and 320 configured to use the difference between the determined data and the reference data to estimate a correction to a multiple of the first time, in order to determine a distance between the receiver and an origin of the signal.

Figure 1:
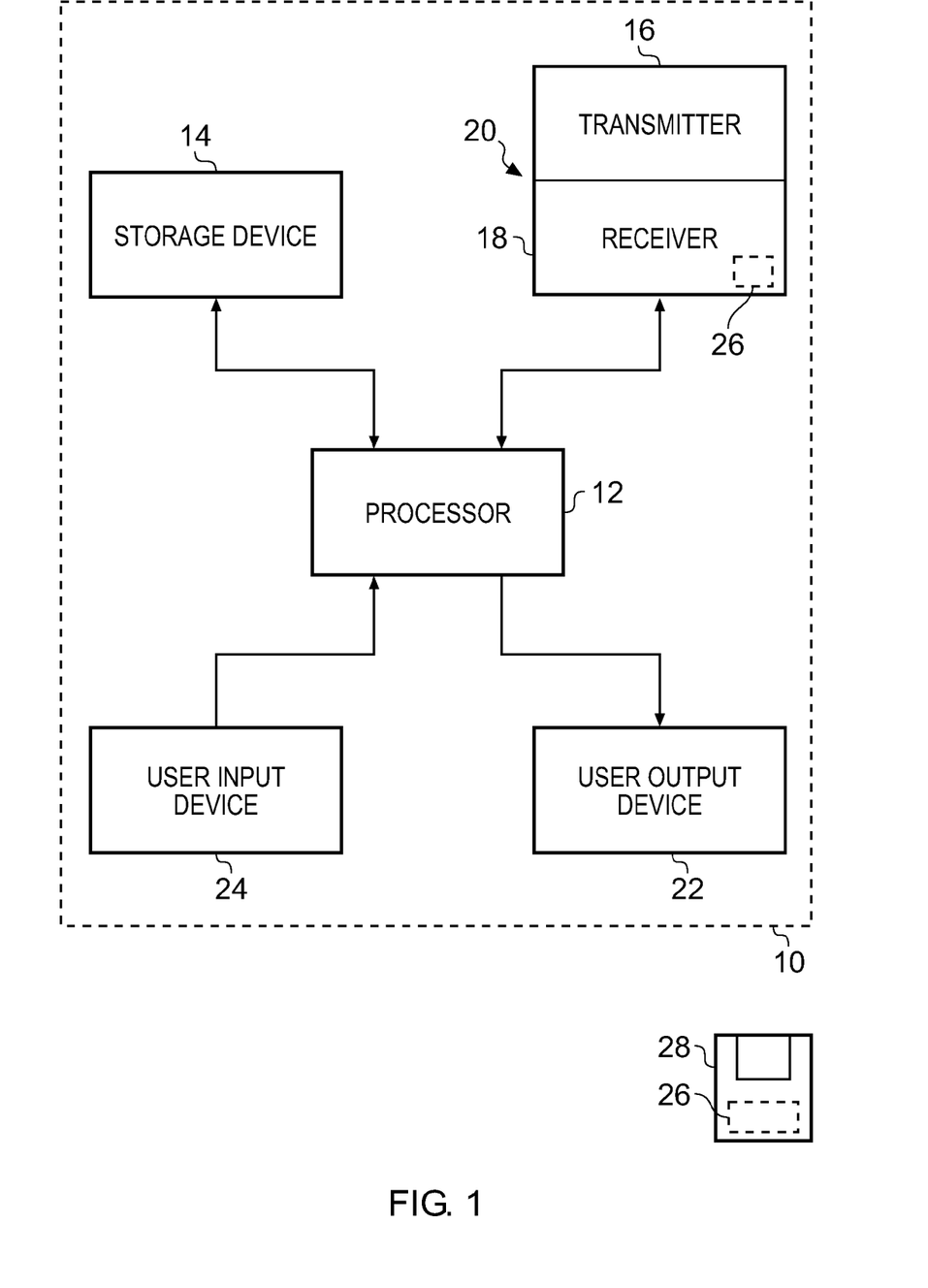
FIG. 1 illustrates an apparatus.

FIG. 1 illustrates an apparatus 10. The apparatus 10 may, for example, be a portable electronic device. The apparatus 10 comprises a processor 12, a storage device 14, a transceiver 20, a user output device 22 and a user input device 24.

The processor 12 is connected to write to and read from the storage device 14. The storage device 14 may be a single memory unit or a plurality of memory units.

The processor 12 is connected to receive an input from the user input device 24 and may, for example, comprise a keypad and/or an audio input. The processor 12 is also connected to provide an output to the user output device 22. The user output device 22 is for conveying information to a user and may, for example, comprise a display or an audio output. The user input device 24 and the user output device 22 may be provided as a single unit, such as a touch screen display device.

The processor 12 is operable to receive an input from and provide an output to the radio transceiver 20. The radio transceiver 20 functions as a transmitter 16 and/or a receiver 18. The radio transceiver 20 may be configured to transmit and receive orthogonal frequency division multiplexed (OFDM) signals, such as Wireless Local Area Network (WLAN) 802.11a signals.

The receiver 18, transmitter 16 and the transceiver 20 are described below using a plurality of functional blocks. The receiver 18, transmitter 16 or the transceiver 20 may comprise a single integrated circuit or a set of integrated circuits (i.e. a chipset) for carrying out these functions. The integrated circuit(s) may comprise one or more hardwired, application-specific integrated circuits (ASICs) and/or one or more programmable processors for carrying out the functions using computer program instructions 26.

A chip or chipset for performing embodiments of the invention may be incorporated within a module. Such a module may be integrated within the apparatus 10, and/or may be separable from the apparatus 10.

It will also be appreciated by the skilled person that, although functions are described below as being performed by the transmitter 16, the receiver 18 or the transceiver 20, at least part of the functions may alternatively be carried out by the main processor 12 of the apparatus 10. In particular, time offset estimation and distance estimation may be performed by the processor 12.

The computer program instructions 26 may arrive at the apparatus 10 via an electromagnetic carrier signal or be copied from a physical entity 28 such as a computer program product, a memory device or a record medium such as a CD-ROM or DVD.

A storage device of the transmitter 16, the receiver 18 or the transceiver 20 or the storage device 12 of the apparatus 10 may store computer program instructions 26 that control the operation of the apparatus 10 when loaded into a processor. The computer program instructions 26 may provide the logic and routines that enables the apparatus to perform the methods illustrated in FIGS. 3 and 8.

The computer program instructions provide: instructions for transforming a received signal, to determine data in a received signal, wherein the signal is received periodically every first time; instructions for comparing the determined data with reference data; and instructions for using the difference between the determined data and the reference data to estimate a correction to a multiple of the first time, in order to determine a distance between the receiver and an origin of the signal.

Figure 2:
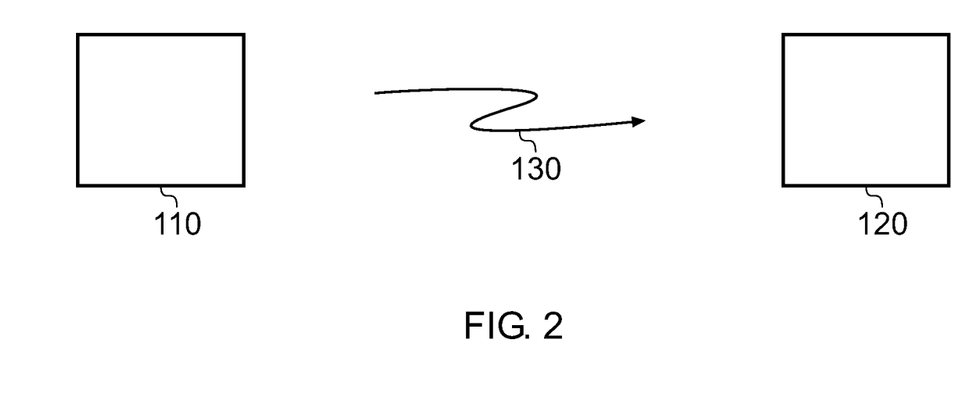
FIG. 2 illustrates a first apparatus transmitting a signal to a second apparatus.

FIG. 2 illustrates a first apparatus 110 transmitting an OFDM signal 130 to a second apparatus 120. The first apparatus 110 and the second apparatus 120 may take the same form as the apparatus illustrated in FIG. 1.

Figure 3:
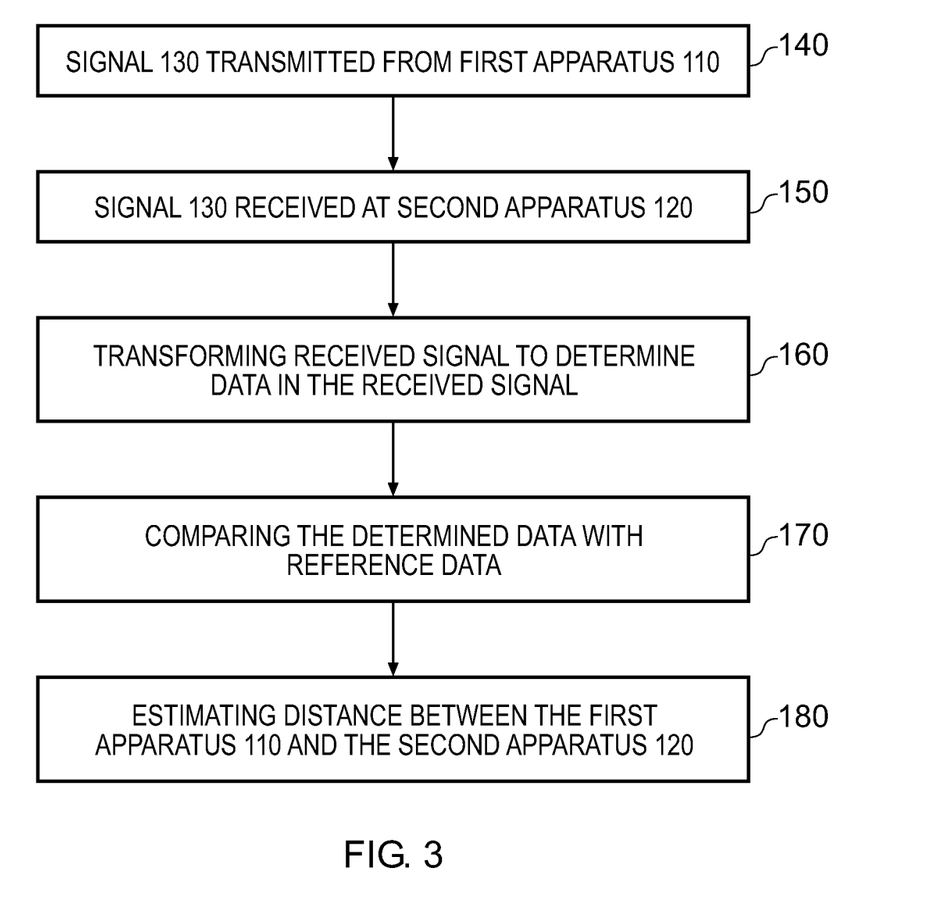
FIG. 3 illustrates a method of distance estimation.

FIG. 3 illustrates a flow diagram of a method for estimating the distance between the first apparatus 110 and the second apparatus 120 illustrated in FIG. 2.

At block 140 of FIG. 3, the first apparatus 110 transmits a signal 130 to the second apparatus 120.

Figure 4:
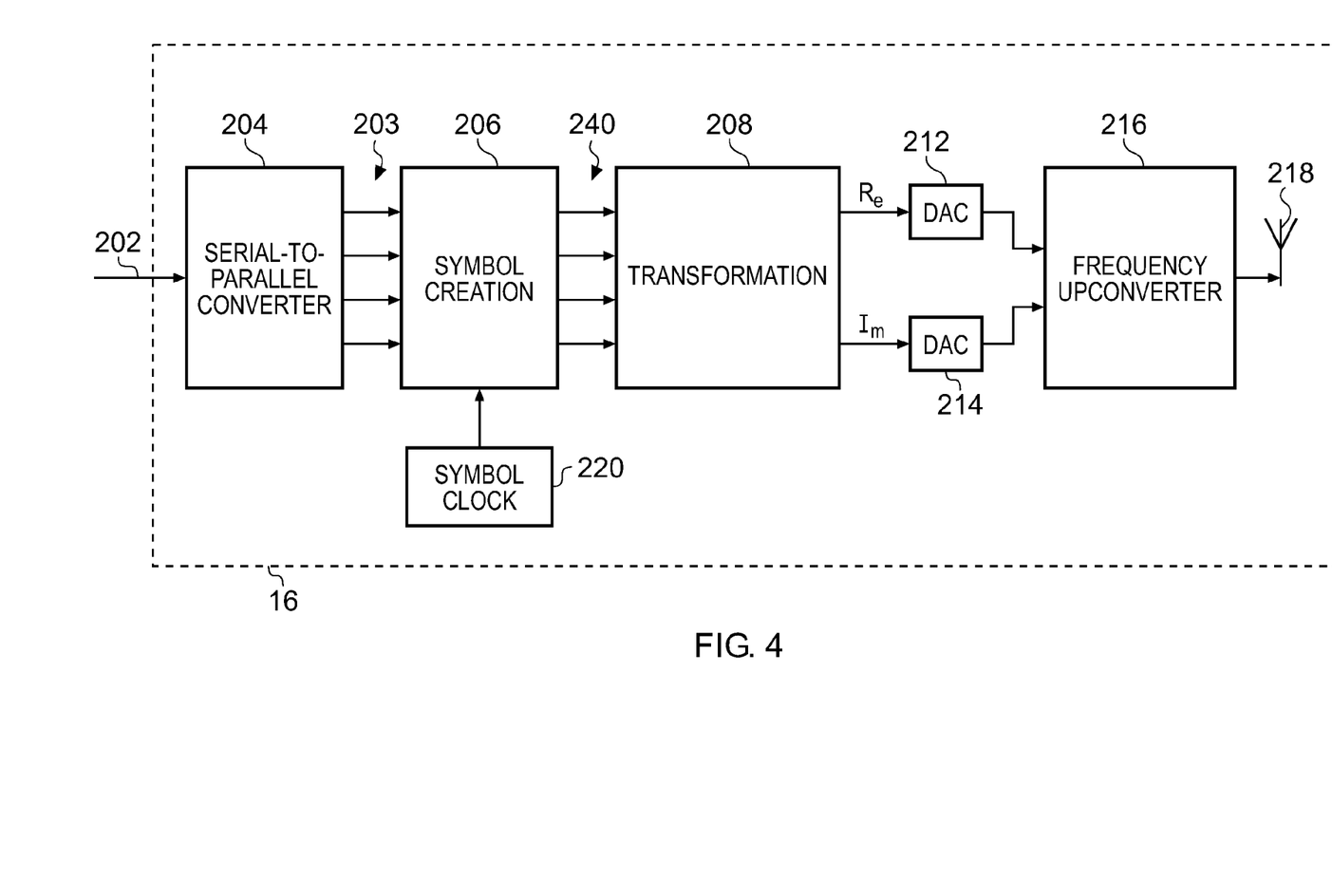
FIG. 4 illustrates a schematic diagram of a transmitter.

FIG. 4 illustrates a functional schematic of the transmitter 16 used to transmit the signal 130. In this embodiment, the transmitter 16 is configured to transmit OFDM signals. The transmitter 16 comprises circuitry relating to serial-to-parallel conversion 204, symbol creation 206, transformation 208, digital-to-analogue conversion 212, 214, frequency up-conversion 216 and a symbol clock 220.

The processor 12 of the apparatus 10 is configured to output a serial bitstream 202 to the serial-to-parallel converter 204 of the transmitter 16. The serial bitstream 202 is data that is to be transmitted to the second apparatus 120. The serial-to-parallel converter 204 converts the serial bitstream to N parallel bitstreams 203 by interleaving the data on the serial bitstream 202. FIG. 4 shows the serial bitstream 202 being converted into four parallel bitstreams 203, illustrating one particular embodiment of the invention. In practice, the serial bitstream could be converted into any number of parallel bitstreams.

The N parallel bitstreams 203 are provided as an input to the symbol creation circuitry 206. The symbol creation circuitry 206 is configured to convert a segment of each the N parallel bitstreams into a symbol. Each symbol may comprise any number of bits. Symbols are created periodically by the symbol creation circuitry 206, according to a time basis set by the symbol clock 220.

N symbols are created by the symbol creation circuitry 206 and then set on a bus 240 connecting the symbol creation circuitry 206 with the transformation circuitry 208. N different symbols are set on the bus 240 for a setting period $T_{set}$ during every period $T_{clock}$ of the symbol clock 220. The clock period $T_{clock}$ may include a guard period $T_{guard}$, which is a period in which no information is set on the bus 240, enabling the transformation circuitry 208 to clearly differentiate when the information being provided by the symbol creation circuitry 206 changes. If there is a guard period, $T_{clock} = T_{set} + T_{guard}$.

Figure 6A:
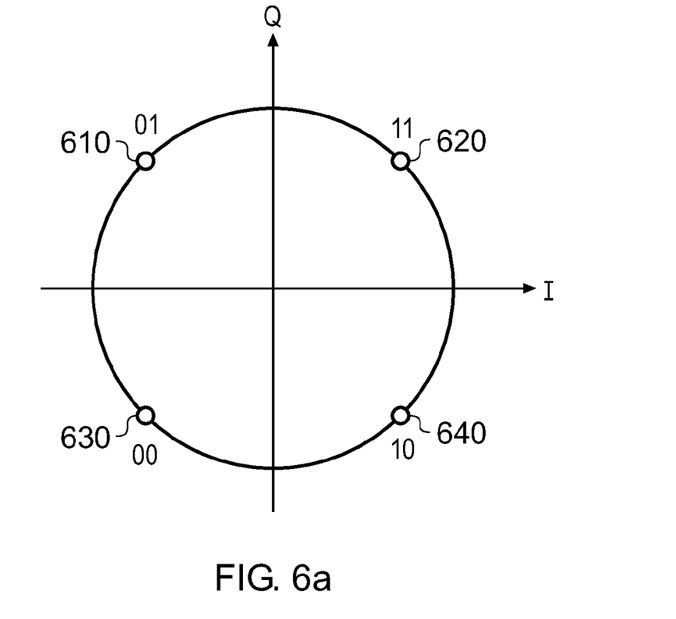
FIG. 6a illustrates a constellation diagram for Quadrature Phase Shift Keying.

It may be that the symbol creation circuitry 206 creates symbols using a modulation technique such as amplitude modulation or phase shift keying. An example of a suitable modulation technique is Quadrature Phase Shift Keying (QPSK). In QPSK, a bitstream is split into in-phase (I) and quadrature (Q) components. Each symbol consists of two bits. FIG. 6a illustrates the position of each of the possible QPSK symbols ([0, 1], [1, 1], [1, 0], [0, 0]) on a constellation diagram as vector points 610, 620, 630 and 640.

The transformation circuitry 208 performs a transformation on the input symbols. An example of a suitable transformation is an inverse discrete Fourier transform, which changes the input signal from the frequency domain to the time domain. An inverse fast Fourier transform algorithm may be used to perform the inverse discrete Fourier transform. After an inverse discrete Fourier transform has been performed on the N input symbols, a signal is produced that includes an OFDM sub-carrier for each of the N input symbols.

The real part of each signal output by the transformation circuitry 208 is provided as an input to a digital-to-analogue converter (DAC) 212. Similarly, the imaginary part of each signal is provided to a DAC 214. The outputs from the DAC's 212, 214 are provided to a frequency upconverter 216, which changes the frequency of each signal from the baseband frequency to a frequency suitable for RF transmission. The frequency upconverter 216 provides an output to an antenna 218, which transmits the OFDM signals 130 as electromagnetic waves.

At block 150 of FIG. 3, the OFDM signal 130 is received at the antenna 322 of the second apparatus 120.

Figure 5:
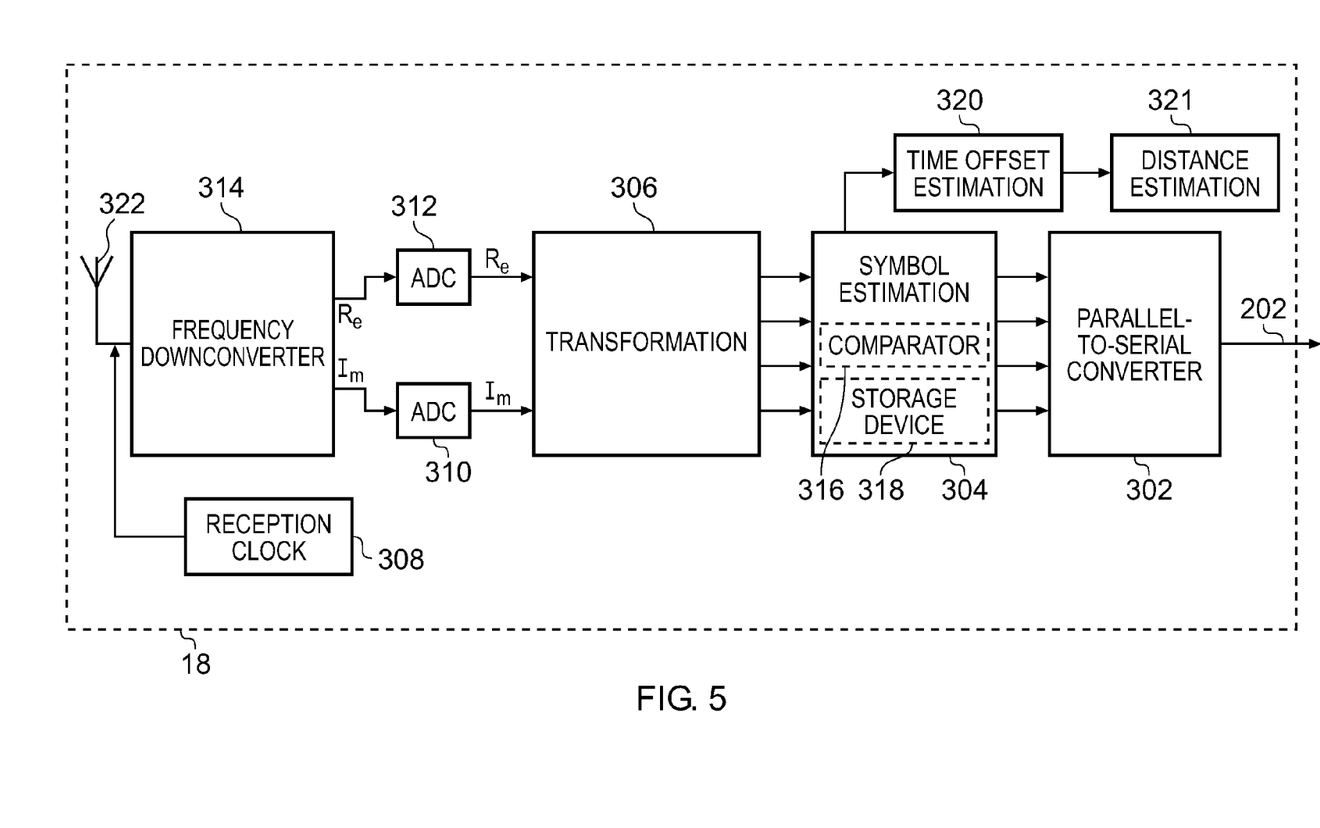
FIG. 5 illustrates a schematic diagram of a receiver.

FIG. 5 illustrates a functional schematic of the receiver 18 of the second apparatus 120, which is configured to receive the OFDM signal 130. The receiver 18 comprises a reception symbol clock 308, a frequency down-converter 314, analogue-to-digital converters (ADC's) 310 and 312, transformation circuitry 306, symbol estimation circuitry 316, a parallel-to-serial conversion circuitry 302, time offset estimation circuitry 320 and distance estimation circuitry 321.

The reception symbol clock 308 periodically enables the antenna 322 to receive an OFDM signal. When the antenna 322 receives the OFDM signal 130 during an enablement period, it provides the signal as an input to a frequency down-converter 314. The frequency down-converter 314 reduces the frequency of the received OFDM signal and provides the real and imaginary parts of the signal to first and second ADC's 312 and 310. The first ADC 312 provides the real part of the signal to the transformation circuitry 306 (in digitized form) and the second ADC 310 provides the imaginary part (in digitized form).

At block 160 of FIG. 3, a transform is performed on the received signal to determine data.

The transformation circuitry 306 of the receiver performs an inverse transformation to that performed by the transformation circuitry 208 of the transmitter 16. For example, where the transformation circuitry 208 of the transmitter 16 is configured to perform an inverse discrete Fourier transform to convert the signal from the frequency domain to the time domain, the transformation circuitry 306 of the receiver 18 is configured to perform a discrete Fourier transform. A fast Fourier transform algorithm may be used to perform the discrete Fourier transform.

The transformation circuitry 306 transforms the input signal (including the real and imaginary parts) and outputs N data signals to symbol estimation circuitry 304, where each output data signal relates to a symbol.

At block 170 of FIG. 3, the determined data (corresponding to the received symbols) is compared with reference data to determine which symbols have been received.

The embodiment shown in FIG. 5 illustrates 4 lines of signals being provided to the symbol estimation circuitry 304, reflecting the four lines of symbols that were provided to the transformation circuitry 208 in the transmitter 16. The number of symbols recovered from the received OFDM signal following transformation depends upon the number of symbols inserted into the transmitted signal.

In ideal conditions, the data output by the transformation circuitry 306 of the receiver 18, which represents symbols, will correspond exactly on a constellation diagram with the symbols that were created by the symbol creation circuitry 206 of the transmitter 16. That is, if symbols corresponding to points 610, 620, 630 and 640 in FIG. 6a (representing the symbols [0, 1], [1, 1], [0, 0] and [1, 0] respectively) were created by the symbol creation circuitry 206 of the transmitter 16, data corresponding to points 610, 620, 630 and 640 will be output by the transformation circuitry 306 of the receiver 18.

However, if conditions are not ideal, the data output by the transformation circuitry 306 will not correspond exactly with the vector points 610, 620, 630 and 640.

The symbol estimation circuitry 316 of the receiver 18 comprises a storage device 318 and a comparator 316. The storage device 318 stores reference data corresponding to all of the possible symbols that may be created by the symbol creation circuitry 206 of the transmitter 16. For instance, In the QPSK example illustrated in FIG. 6a, reference data corresponding to symbols 610, 620, 630 and 640 is stored in the storage device 318.

The comparator 316 is configured to compare the reference data with the data determined by the transformation circuitry 306. In the ideal case, the comparator 316 is able to determine from the comparison that the determined data matches exactly with the stored reference data, and is therefore able to ascertain which symbols the determined data relates to. In a non-ideal case, the comparator 316 is configured to determine from the comparison which reference symbols the determined data is most likely to correspond with.

Non-ideal conditions arise if the symbol clock 220 of the transmitter 16 and the reception symbol clock 308 of the receiver 18 are not synchronized, resulting in the data determined by the transformation circuitry 306 of the receiver 18 being phase-offset from the reference data stored in the storage device 318.

Non-ideal conditions also arise if the symbol clocks 220, 308 are synchronized but the electromagnetic signal that is received by the antenna of the receiver 18 is not received at the same phase as the transmitted electromagnetic signal (that is, if the receiver 18 is not a distance corresponding to whole number of signal wavelengths away from the transmitter 16), resulting in the data determined by the transformation circuitry 306 of the receiver 18 being phase-offset from the reference data stored in the storage device 318.

Figure 6B:
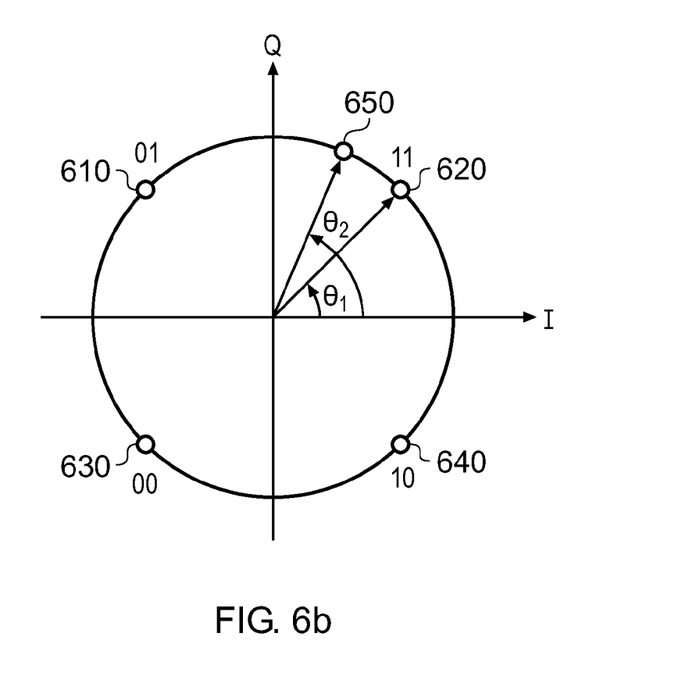
FIG. 6b illustrates a constellation diagram for Quadrature Phase Shift Keying, including value representing a measured data.

FIG. 6b illustrates a constellation diagram having a vector point 650 which relates to a portion of the determined data. The vector point 650 relates to the symbol [1, 1], but is phase-offset from the ideal position of the symbol [1, 1] given by point 620.

The comparator 316 is configured to compare the portion of determined data with the reference data stored in the storage device 318 and determine the closest 'ideal point' to the determined vector point 650. In this instance, the closest ideal point is the vector point 620, which corresponds to the symbol [1, 1]. The comparator 316 therefore estimates that the portion of the determined data corresponds to the symbol [1, 1].

Once the symbol estimation circuitry 304 has estimated which symbols correspond with the determined data, the estimated symbols are output to the parallel-to-serial converter 302. The parallel-to-serial converter 302 combines the N parallel bitstreams (in the illustrated case, N=4) to produce a serial bitstream 202, performing an inverse operation to that performed by the serial-to-parallel converter 204 of the transmitter 16. The serial bitstream 202 is output to the processor 12 of the apparatus for processing.

At block 180 of FIG. 3, the distance between the first apparatus 11 and the second apparatus 120 is estimated.

The distance d between the first apparatus 110 and the second apparatus 120 is given by the equation:

$$d = c \times t_{tof} \quad (1)$$

where c is the speed of light and $t_{tof}$ is the time of flight of the received signal.

Consider a situation where the reception symbol clock 308 operates with the same periodicity as the symbol clock 220 and is synchronized with the symbol clock 220. This can be achieved by the first apparatus 110 transmitting information relating to its clock to the second apparatus 120.

In this case, it can be assumed that the measured difference in phase between the transmitter 16 and the receiver 18 is due to the electromagnetic signal being received by the receiver 18 at a different phase to the transmitted electromagnetic signal.

A rough estimate of the time of flight of the received signal $t_{tof-approx}$ can be made by counting the number of whole periods of time of the reception clock 308 (or, equivalently, the symbol clock 220) n that elapse between the transmission and the reception of the electromagnetic OFDM signal 130 and multiplying it by the period $T_{clock}$ of the reception clock 220:

$$t_{tof-approx} = nT_{clock} \quad (2)$$

A rough estimation of the distance that separates the first apparatus 110 and the second apparatus 120 is therefore:

$$d_{approx} = c \times n T_{clock} \quad (3)$$

However, this estimation of the distance can be improved by determining how the phase of the received signal differs from the phase of the transmitted signal.

The position of each vector point on the constellation diagram is described by the equation:

$$z = R e^{i\theta} \quad (4)$$

where z is the position of the vector point on the constellation diagram, R is the radius of the point from the intersection of the Inphase and Quadrature axes and θ is the angle between the vector and the Inphase axis.

The phase offset $\theta_{offset}$ between the measured vector point 650 and the ideal vector point 620 is given by:

$$\theta_{offset} = \theta_2 - \theta_1 \quad (5)$$

where $\theta_2$ is the phase of the determined vector point 650 and $\theta_1$ is the phase of the ideal point 620, as measured from the Inphase axis of the constellation diagram (see FIG. 6b).

The phase $\theta_{offset}$ can be used to make a correction to the $n^{th}$ multiple of the symbol clock time $T_{clock}$ and therefore also to make a correction to the rough estimate of the time of flight $t_{tof-approx}$, by calculating a time offset, Δt, where:

$$\Delta t = \frac{\theta_{offset}}{\omega} \quad (6)$$

where ω is the angular frequency of the determined vector point 650 i.e. the sub-carrier frequency for the detected symbol.

The time offset estimation circuitry 320 is configured to perform the calculation given in equation 6 after receiving the relevant phase offset information from the symbol estimation circuitry 304.

An improved estimation of the time of flight of the received signal, $t_{tof-imp}$, can be found by adding the number of periods of time that have elapsed between transmission and reception of the electromagnetic signal to the average time offset, Δt:

$$t_{tof-imp} = nT + \Delta t \quad (7)$$

An improved calculation of the distance d may then be made using the improved estimation of the time of flight:

$$d_{est-imp} = c \times t_{tof-imp} \quad (8)$$

where $d_{est-imp}$ is the improved estimation of the distance between the first apparatus 110 to the second apparatus 120.

The distance estimation circuitry 321 is configured to perform the calculation given in equations 7 and 8 after receiving the relevant time offset information from the time offset estimation circuitry 320.

Optionally, the distance $d_{est-imp}$ may be estimated multiple times (e.g. one for each sub-carrier) and averaged by the distance estimation circuitry 321 to reduce error.

Figure 7:
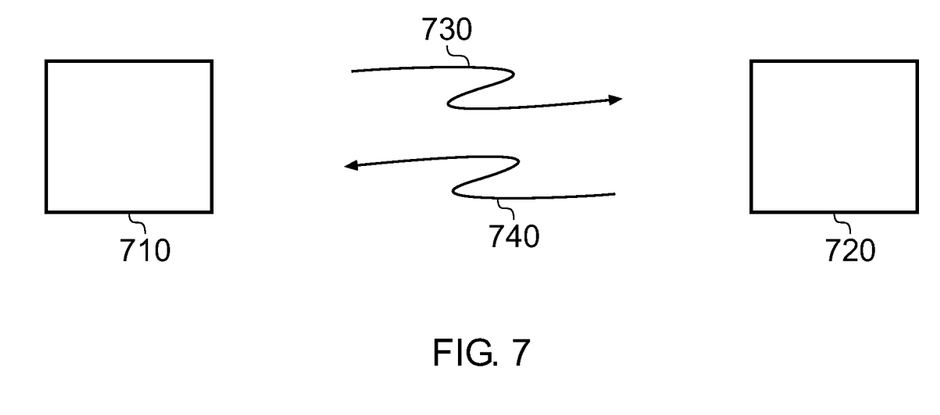
FIG. 7 illustrates a first signal being transmitted from a first apparatus to a second apparatus and a second signal being transmitted from the second apparatus to the first apparatus.

FIG. 7 illustrates a first OFDM signal 730 being transmitted from a first apparatus 710 to a second apparatus 720, and a second signal 740 being transmitted from the second apparatus 720 to the first apparatus 710. The first and second apparatus 710 and 720 take the same form as the apparatus 10 described in FIG. 1.

In this embodiment, the first and second apparatuses 710 and 720 each comprise a transceiver 20 which has the functionality of the transmitter 16 and the receiver 18 described above. It should be recognized that the schematics of the transmitter 16 and the receiver 18 in FIGS. 4 and 5 illustrate the functions of the transceiver when transmitting and receiving. Each of the components/blocks in these schematics need not relate to a separate element in the transceiver 20. For example, the antenna 322 used for reception may be the same as the antenna 218 used for transmission.

In a transceiver 20, the symbol clock 220 of the transmitter 16 and the reception clock 308 of the receiver 18 are synchronized, have the same periodicity and may operate using the same clock source.

Figure 8:
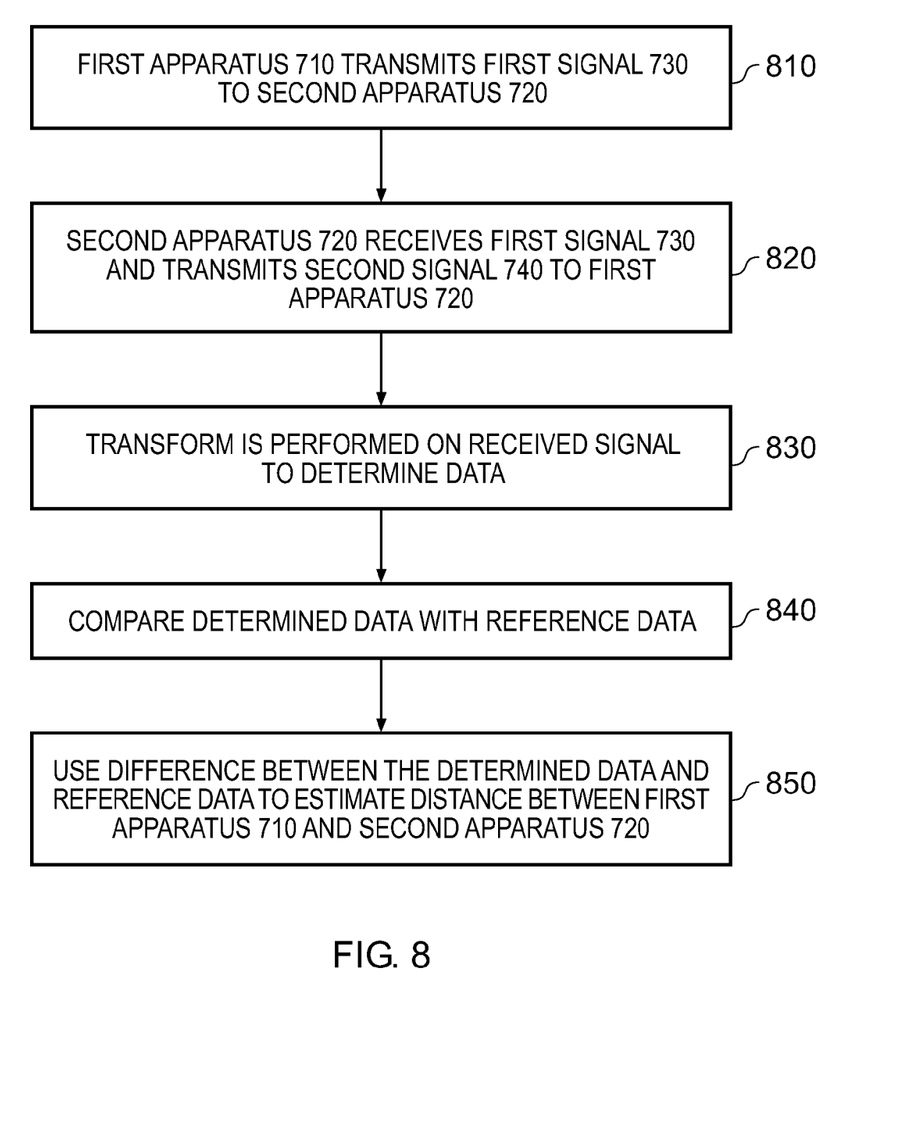
FIG. 8 illustrates a schematic block diagram of a second method of distance estimation.

FIG. 8 illustrates a flow diagram of a method relating to the FIG. 7 embodiment of the invention. At block 810, the first apparatus 710 transmits the first signal 730 to the second apparatus 720. From the point at which the first symbol is created by the symbol creator 206, the first apparatus 710 begins to count the number n of symbol clock 220 periods of time $T_{clock}$ that elapse.

At block 820 of FIG. 8, the second apparatus 720 receives the first signal 730 and waits for a period of time $mT_{clock}$, and then transmits the second signal 740 to the first apparatus 710, where m is an integer and $T_{clock}$ is the period of the symbol clock 220 in the first apparatus 710.

In a first implementation of the FIG. 7 embodiment of the invention, the receiver 18 of the second apparatus 720 need not transform the first signal 730 from the time domain into the frequency domain using the transformation circuitry 306. The processing circuitry 12 may control the transmitter 16 of second apparatus 720 to merely re-transmit the first signal 730, as the second signal 740, without transforming the first signal 730 into the frequency domain. An advantage of this is that the processing burden on the second apparatus 720 is low, resulting in low power consumption.

In some embodiments of the invention, the first signal 730 is transmitted along with a synchronization signal. For example, the synchronization signal may be concatenated with the first signal 730. In a WLAN implementation of the invention, the synchronization signal may be formed by a plurality of OFDM sub-carriers and may, for instance, comprise one or more predetermined training symbols.

In a second implementation of the FIG. 7 embodiment of the invention, the receiver 18 of the second apparatus 720 is configured to analyze the synchronization signal to find the beginning of the first training symbol in the synchronization signal. The receiver 18 uses this analysis to provide the timing base for transforming the training symbols included in the synchronization signal into the frequency domain using the transformation circuitry 306. This process removes the phase error that is introduced by the flight of the synchronization signal from the first apparatus 710 to the second apparatus 720.

The reference data stored in the storage device 318 of the receiver 18 of the second apparatus 720 may include predetermined reference training symbols that correspond with the training symbols received in the synchronization signal. The comparator 316 may be configured to compare the predetermined reference training symbols with the training symbols received in the synchronization signal. The difference between the predetermined reference training symbols and the training symbols received in the synchronization signal is indicative of the (interference) effect that multi-path propagation has had on the received training symbols (during travel from the first apparatus 710 to the second apparatus 720).

After the training symbols in the synchronization signal have been received and transformed, the receiver 18 reverts back to using the original timing base of the reception clock 308 to transform the first signal 730 into the frequency domain, rather than the beginning of the first training symbol in the synchronization signal. This ensures that the "phase information" contained in the first signal 730 is not removed when the first signal 730 is received at the second apparatus 720.

The second implementation of the FIG. 7 embodiment of the invention differs from the first implementation in that the first signal 730 is transformed into the frequency domain by the transformation circuitry 306 of the receiver 18 of the second apparatus 720.

Circuitry 304 of the receiver 18 is configured, in the second implementation, to create a second signal 740 by using the determined difference between the predetermined reference training symbols and the received training symbols to remove the effect that multi-path propagation has had on the received first signal 730. In this regard, it is assumed that multi-path propagation will have had a similar effect on the first signal 730 as it had on the synchronization signal.

The second signal 740 is transmitted to the first apparatus 710. The second signal 740 is effectively a re-transmission of the first signal 730, but the effects of multi-path propagation have been corrected at the second apparatus 720. An advantage of this, compared with the first implementation, is that the second signal 740 is less likely to be corrupted when it is received at the first apparatus 710. It is also possible for the receiver 18 of the first apparatus 710 to perform a similar process to that described above (in relation to the second apparatus 720) on the second signal 740, to remove the interference effect that multi-path propagation has on the second signal 740 when it travels from the second apparatus 720 to the first apparatus 710.

In both the first and second implementations, the first apparatus 710 receives the second signal 740 and follows the same processes as those discussed above in relation the reception of signal 130 in block 150 of FIG. 3.

At block 830 of FIG. 8, the transformation circuitry 306 of the receiver 18 of the first apparatus 710 performs a transform on the received second signal 740 to determine data, in the same manner as that discussed above in relation block 160 of FIG. 3.

At block 840 of FIG. 8, the determined data (corresponding to the received symbols) is compared with reference data to determine which symbols have been received, in the same manner that described above in relation to block 170 of FIG. 3.

At block 850 of FIG. 8, the difference between the determined data and the reference data is used to estimate the distance between the first apparatus 710 and the second apparatus 720.

A time offset $\Delta t$ for a particular symbol may calculated using equations 5 and 6, as discussed above. The time taken for the second apparatus 720 between receiving the first signal 730 and transmitting the second signal 740, which is equal to $mT_{clock}$, is known to the first apparatus 710 meaning that advantageously, the first apparatus 710 is able to determine the combined time of flight of the first and second signals, $t_{tof-12}$, using the equation:

$$t_{tof-12} = T_{clock}(n-m) + \Delta t \qquad (9)$$

It may be that whenever the second apparatus 720 transmits a second signal 740 in response to the reception of a first signal 730, the time taken between the reception of the first signal 730 and the transmission of the second signal 740, $mT_{clock}$, remains the same, and that this predetermined value is known by the first apparatus 710. In a situation where the second apparatus 720 chooses to deviate from the predetermined value (e.g. because the transmission channel to be used is unavailable), it may include an indication of the value of m or $mT_{clock}$ as data in the second signal 740 or in another signal transmitted to the first apparatus 710.

It follows from equation (9) that the estimated distance $d_{est}$ from the first apparatus 710 to the second apparatus 720 is:

$$d_{est} = \frac{c[T_{clock}(n-m) + \Delta t]}{2} \qquad (10)$$

Optionally, the distance $d_{est}$ may be estimated multiple times (once for each sub-carrier) and averaged by the distance estimation circuitry 321 to reduce error.

In some embodiments, the estimated distance $d_{est}$ between the first apparatus 710 and the second apparatus 720 may be determined at both the first apparatus 710 and the second apparatus 720.

In one embodiment, a third signal may be transmitted from the first apparatus 710 to the second apparatus 720. The first apparatus 710 may use the first and second signals to determine the estimated distance $d_{est}$ and the second apparatus 720 may use the second and third signals to determine the estimated distance $d_{est}$.

Alternatively, a third signal may be transmitted from the second apparatus 720 to the second apparatus 710 and a fourth signal may be transmitted from the first apparatus to the second apparatus 720. In this example, the first apparatus 710 may use the first and second signals to determine the estimated distance $d_{est}$ and the second apparatus 720 may use the third and fourth signals to determine the estimated distance $d_{est}$.

The second apparatus 720 may, for example, transmit its distance estimation to the first apparatus 710 to enable the first apparatus 710 to produce an averaged distance estimation using the estimated value(s) calculated at the second apparatus 720.

At least portions of the blocks illustrated in FIGS. 3 and 8 may represent steps in a method and/or sections of code in the computer program 26. The illustration of a particular order to the blocks does not necessarily imply that there is a required or preferred order for the blocks and the order and arrangement of the block may be varied.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:
1. A method, comprising:
    transforming an orthogonal frequency division multiplexed signal, received at a receiver, in order to determine data from sub-carriers of the received orthogonal frequency division multiplexed signal, wherein the orthogonal frequency division multiplexed signal comprises phase shift keying symbols;
    comparing data determined from a first sub-carrier of the orthogonal frequency division multiplexed signal with first reference data to determine a first phase difference between a phase of the first sub-carrier when transmitted and a phase of the first sub-carrier when received;

comparing data determined from a second sub-carrier of the orthogonal frequency division multiplexed signal with second reference data to determine a second phase difference between a phase of the second sub-carrier when transmitted and a phase of the second sub-carrier when received; and using the determined first phase difference and the determined second phase difference to determine an average distance between the receiver and an origin of the orthogonal frequency division multiplexed signal, wherein the average distance is an average of a first distance for the first sub-carrier of the orthogonal frequency division multiplexed signal and a second distance for the second sub-carrier of the orthogonal frequency division multiplexed signal.

2. The method as claimed in claim 1, wherein the average distance is determined by determining the time of flight of the orthogonal frequency division multiplexed signal, and the time of flight of the orthogonal frequency division multiplexed signal is determined using a multiple of a period of time and a correction to the multiple of the period of time.

3. The method as claimed in claim 2, wherein the receiver is a transceiver, and the method further comprises the transceiver transmitting a further orthogonal frequency division multiplexed signal to a further transceiver, and, subsequently, the further transceiver transmitting the orthogonal frequency division multiplexed signal to the transceiver wherein the time taken by the further transceiver between receiving the further orthogonal frequency division multiplexed signal and transmitting the signal to the transceiver is a multiple of the period of time.

4. The method as claimed in claim 3, wherein the average distance is determined by determining the time of flight of the orthogonal frequency division multiplexed signal, and the time of flight of the orthogonal frequency division multiplexed signal is determined using a multiple of the period of time, the time taken by the further transceiver and the correction to the multiple of the period of time.

5. The method as claimed in claim 2, wherein the determined first and second phase differences are used to estimate the correction to the multiple of the period of time.

6. The method as claimed in claim 1, wherein the data determined from the first sub-carrier is a first symbol and the first reference data is determined by comparing the first symbol with a plurality of possible symbols to estimate which of the plurality of possible symbols is a best match for the first symbol; and wherein the first reference data and the first symbol are the same if no phase difference is determined.

7. The method as claimed in claim 1, wherein the orthogonal frequency division multiplexed signal is transformed from the time domain to the frequency domain.

8. The method as claimed in claim 1, wherein the receiver removes a multi-path interference effect from the orthogonal frequency division multiplexed signal.

9. The method as claimed in claim 1, wherein the receiver is a transceiver, and the method further comprises the transceiver transmitting a further orthogonal frequency division multiplexed signal to a further transceiver, and, subsequently, the further transceiver transmitting the orthogonal frequency division multiplexed signal to the transceiver.

10. The method as claimed in claim 9, wherein a multi-path interference effect is removed from the further orthogonal frequency division multiplexed signal by the further transceiver and subsequently the further orthogonal frequency division multiplexed signal is re-transmitted to the transceiver as the orthogonal frequency division multiplexed signal.

11. An apparatus, comprising:

transformation circuitry configured to transform an orthogonal frequency division multiplexed signal, received at a receiver, in order to determine data from sub-carriers of the received orthogonal frequency division multiplexed signal, wherein the orthogonal frequency division multiplexed signal comprises phase shift keying symbols;

a comparator configured to compare the data determined from a first sub-carrier of the orthogonal frequency division multiplexed signal with first reference data to determine a first phase difference between a phase of the first sub-carrier when transmitted and a phase of the first sub-carrier when received, and configured to compare the data determined from a second sub-carrier of the orthogonal frequency division multiplexed signal with second reference data to determine a second phase difference between a phase of the second sub-carrier when transmitted and a phase of the second sub-carrier when received; and estimation circuitry configured to use the determined first phase difference and the determined second phase difference to determine an average distance between the apparatus and an origin of the orthogonal frequency division multiplexed signal, wherein the average distance is an average of a first distance for the first sub-carrier of the orthogonal frequency division multiplexed signal and a second distance for the second sub-carrier of the orthogonal frequency division multiplexed signal.

12. The apparatus as claimed in claim 11, wherein the estimation circuitry is configured to determine the average distance by determining the time of flight of the orthogonal frequency division multiplexed signal, and the time of flight of the orthogonal frequency division multiplexed signal is determined using a multiple of a period of time and a correction to the multiple of the period of time.

13. The apparatus as claimed in claim 12, wherein the estimation circuitry is configured to use the determined first and second phase differences to estimate the correction to the multiple of the period of time.

14. The apparatus as claimed in claim 11, wherein the data determined from the first sub-carrier is a first symbol; and wherein the comparator is configured to determine the first reference data by comparing the first symbol with a plurality of possible symbols to estimate which of the plurality of possible symbols is a best match for the first symbol; and wherein the first reference data and the first symbol are the same if no phase difference is determined.

15. The apparatus as claimed in claim 11, wherein the transformer is configured to transform the orthogonal frequency division multiplexed signal from the time domain to the frequency domain.

16. A non-transitory computer-readable storage medium storing a computer program comprising computer program instructions that, when executed by at least one processor, cause an apparatus to perform at least the following:

transforming an orthogonal frequency division multiplexed signal, received at a receiver, in order to determine data from the sub carriers of the received orthogonal frequency division multiplexed signal, wherein the orthogonal frequency division multiplexed signal comprises phase shift keying symbols;

comparing the data determined from a first sub-carrier of the orthogonal frequency division multiplexed signal with first reference data to determine a first phase difference between a phase of the first sub-carrier when transmitted and a phase of the first sub-carrier when received;

comparing the data determined from a second sub-carrier of the orthogonal frequency division multiplexed signal with second reference data to determine a second phase difference between a phase of the second sub-carrier when transmitted and a phase of the second sub-carrier when received; and using the determined first phase difference and the determined second phase difference to determine an average distance between the receiver and an origin of the orthogonal frequency division multiplexed signal, wherein the average distance is an average of a first distance for the first sub-carrier of the orthogonal frequency division multiplexed signal and a second distance for the second sub-carrier of the orthogonal frequency division multiplexed signal.

17. The non-transitory computer-readable storage medium as claimed in claim 16, wherein the average distance is determined by determining the time of flight of the orthogonal frequency division multiplexed signal, and the time of flight of the orthogonal frequency division multiplexed signal is determined using a multiple of a period of time and a correction to the multiple of the period of time; and the determined first and second phase differences are used to estimate the correction to the multiple of the period of time.

* * * * *

UNITED STATES PATENT AND TRADEMARK OFFICE
CERTIFICATE OF CORRECTION

| | | |
|---|---|---|
| PATENT NO. | : 9,001,905 B2 | Page 1 of 1 |
| APPLICATION NO. | : 12/777350 | |
| DATED | : April 7, 2015 | |
| INVENTOR(S) | : Ari Henrik Hamalainen et al. | |

It is certified that error appears in the above-identified patent and that said Letters Patent is hereby corrected as shown below:

On the title page, item 56

On Page 2, References Cited, OTHER PUBLICATIONS, Line 3
    Please delete "Office Actiion" and insert --Office Action--.

In the claims

In Column 12, Claim 16, Line 64
    Please delete "sub carriers" and insert --sub-carriers--.

Signed and Sealed this
Tenth Day of November, 2015

Michelle K. Lee
*Director of the United States Patent and Trademark Office*